(12) United States Patent
Kim

(10) Patent No.: US 9,500,215 B2
(45) Date of Patent: Nov. 22, 2016

(54) LINK MECHANISM AND UNIVERSAL COUPLER BASED ON THE SAME

(71) Applicant: ROBOTIS CO., LTD., Seoul (KR)

(72) Inventor: Byoung Soo Kim, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 363 days.

(21) Appl. No.: 13/871,074

(22) Filed: Apr. 26, 2013

(65) Prior Publication Data

US 2014/0241791 A1   Aug. 28, 2014

(30) Foreign Application Priority Data

Feb. 26, 2013   (KR) ........................ 10-2013-0020549

(51) Int. Cl.
| | | |
|---|---|---|
| *F16B 5/00* | (2006.01) | |
| *F16B 19/10* | (2006.01) | |
| *F16B 5/06* | (2006.01) | |
| *F16B 19/02* | (2006.01) | |
| *F16B 2/26* | (2006.01) | |

(52) U.S. Cl.
CPC ............. *F16B 19/1081* (2013.01); *F16B 2/26* (2013.01); *F16B 5/0642* (2013.01); *F16B 19/02* (2013.01); *Y10T 403/49* (2015.01); *Y10T 403/70* (2015.01)

(58) Field of Classification Search
CPC ....................... F16B 2/26; F16B 5/0642; F16B 5/0657; F16B 2005/0678; F16B 19/1081; F16B 19/02; Y10T 403/49; Y10T 403/70; Y10T 24/45
See application file for complete search history.

(56) References Cited

U.S. PATENT DOCUMENTS

| | | | | |
|---|---|---|---|---|
| 4,461,116 | A * | 7/1984 | Bach ............................ | 446/128 |
| 6,769,849 | B2 * | 8/2004 | Yoneoka ........................ | 411/45 |
| 7,082,650 | B2 * | 8/2006 | Awakura et al. ............... | 24/458 |
| 7,547,061 | B2 * | 6/2009 | Horimatsu .......... | B60R 13/0206 |
| | | | | 296/187.01 |
| 7,556,156 | B2 * | 7/2009 | Lovizzaro ..................... | 210/486 |
| 7,993,085 | B2 * | 8/2011 | McClure ........................ | 411/55 |
| 8,087,364 | B2 * | 1/2012 | Huang-Jung ................ | 108/56.3 |
| 8,534,658 | B2 * | 9/2013 | Schron et al. ............ | 269/289 R |
| 8,690,506 | B2 * | 4/2014 | Wang ............................ | 411/347 |
| 8,720,874 | B2 * | 5/2014 | Tschida et al. .............. | 269/48.1 |
| 2007/0253794 | A1* | 11/2007 | Zhang et al. .................. | 411/45 |
| 2008/0168633 | A1* | 7/2008 | Kim et al. ................... | 24/572.1 |
| 2012/0282023 | A1* | 11/2012 | Riobe .................. | F16B 5/0628 |
| | | | | 403/364 |

OTHER PUBLICATIONS

Robotis Co, Ltd., exhibited photographs, Oct. 25, 2012, Invention has been published at Korean exhibition Robot World 2012 by Robotis Co., Ltd.

* cited by examiner

*Primary Examiner* — Michael P Ferguson
*Assistant Examiner* — Matthew R McMahon
(74) *Attorney, Agent, or Firm* — Revolution IP, PLLC

(57) ABSTRACT

Provided are a link mechanism which is variously combined, assembled and disassembled, and a universal coupler including the same. The link mechanism according to one embodiment of the present invention includes a plate and a coupling piece. The plate has a flat plate shape and a thickness and includes a plurality of coupling holes formed to pass therethrough, the coupling holes have the same size and shape and are disposed at a interval in at least one of a column direction and a row direction. The coupling piece is inserted into the coupling holes of two or more plates to couple two or more plates to each other.

8 Claims, 17 Drawing Sheets

FIG.11
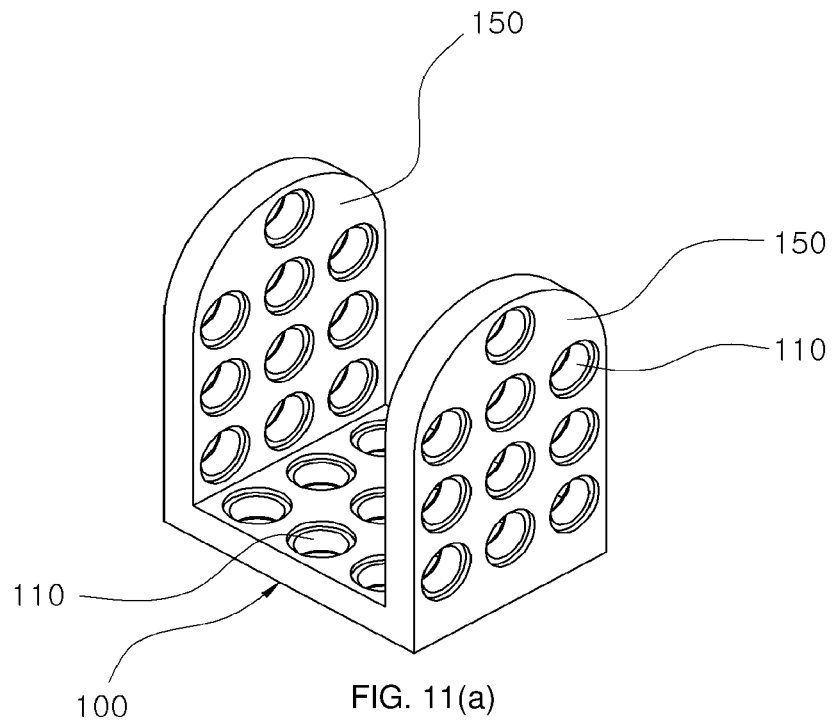
FIG. 11(a)
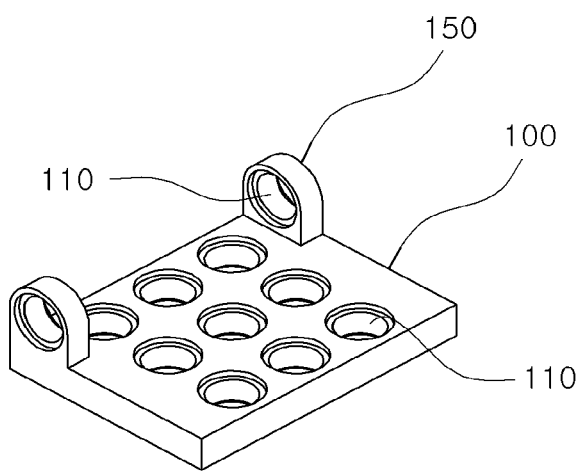
FIG. 11(b)

LINK MECHANISM AND UNIVERSAL COUPLER BASED ON THE SAME

CROSS-REFERENCE TO RELATED APPLICATION

This application claims priority to and the benefit of Korean Patent Application No. 10-2013-0020549, filed on Feb. 26, 2013, the disclosure of which is incorporated herein by reference in its entirety.

BACKGROUND

1. Field of the Invention

The present invention relates to a link mechanism and a universal coupler based on the same, and more particularly, to a link mechanism which can be variously combined and can be easily assembled and disassembled, and a universal coupler based on the same.

2. Discussion of Related Art

In general, a mechanism which can be assembled by means of various shaped blocks or plates into a coupled article with a structure that a user desires and disassembled has been utilized.

Such mechanisms with the normal level in which a plurality of blocks or plates having the same (or similar) shape are assembled into a simple-shaped assembly as well as the high level in which variously shaped frame bodies are provided to enable variously shaped structures to be obtained and various movements to be performed, have been commercialized Such block-type or plate-type mechanisms with the high level aimed at children, young adults and adults should consist of components which can be coupled to each other to achieve various structures and free movement (rotation and the like) between the components should be performed. In addition, there is need to couple and detach the components to and from each other.

However, if a coupling between the frame bodies constituting such a mechanism is performed through assembly utilizing a screw or through fixing utilizing a welding or an adhesive, an assembling process is not convenient, additional tools are required for coupling the frame bodies and it is difficult to disassemble the frame bodies after coupling the frame bodies.

Moreover, if a portion of the frame body through which the frame bodies can be coupled to each other is restricted to a specific area, more detail and various coupling between the frame bodies is limited so that it is difficult to obtain variously shaped structures.

Accordingly, the mechanism which can realize the assembled structure having various shapes and can be easily assembled and disassembled has been required.

SUMMARY OF THE INVENTION

In order to solve the above problems, the technical solution to be achieved by the present invention is to provide a link mechanism which can be variously combined and can be easily assembled and disassembled, and a universal coupler based on the same.

To achieve the above technical solution, one embodiment of the present invention provides a link mechanism including: a first plate having a flat plate shape and a first thickness, and including a plurality of first coupling holes formed to pass therethrough, the first coupling holes having the same size and shape and being disposed at a first interval in at least one of a column direction and a row direction; and a first coupling piece inserted into the first coupling holes of two or more first plates to couple the two or more first plates to each other.

In one embodiment of the present invention, the first coupling hole may include a first through hole having a first diameter and first seating grooves having a second diameter larger than the first diameter of the first through hole and formed on both surfaces of the first plate to form a step between the first through hole and the first seating groove.

In one embodiment of the present invention, the first diameter may be 3.9 mm to 4.1 mm, the second diameter may be 4.9 mm to 5.1 mm, and a first depth of the first seating groove may be 0.8 mm to 1.0 mm.

In one embodiment of the present invention, the first coupling piece may include a first socket having a first body on which a first elastic part inserted into the first coupling hole, split by a first slit and elastically deformed in a radial direction, is formed; a first seating flange formed at one end portion of the first body and coupled to the first seating groove formed on an outer surface of one outermost first plate of the coupled first plates; and a second seating flange formed on the first elastic part and coupled to the first seating groove formed on an outer surface of the other outermost first plate of the coupled first plates; and a first rivet having a second elastic part having an outer diameter corresponding to an inner diameter of an inserting hole passing through the first socket in a central axial direction, split by a second slit and elastically deformed in the radial direction; a second body inserted into the inserting hole to support the first elastic part in the radial direction; and a head formed at one end portion of the second body.

In one embodiment of the present invention, a guide groove may be formed on an inner surface of the inserting hole of the first socket in a longitudinal direction of the first slit on an extension line of the first slit to be spaced from the first slit, and a guide protrusion may be formed on an outer surface of the second elastic part to be inserted into the guide groove and slid along the first slit.

In one embodiment of the present invention, the first slit may have a stopper that protrudes inwardly to restrict movement of the guide protrusion which is completely coupled.

In one embodiment of the present invention, the first socket and the second body may be formed with a length which is an integral multiple of the first thickness of the first plate.

In one embodiment of the present invention, the first coupling piece may include a third body having a third elastic part inserted into the first coupling hole, split by a third slit and elastically deformed in the radial direction; a third seating flange formed at one end portion of the third body and coupled to the first seating groove formed on an outer surface of one outermost first plate of the coupled first plates; a fourth seating flange formed on the third elastic part and coupled to the first seating groove formed on an outer surface of the other outermost first plate of the coupled first plates; and an extension part extending from the fourth seating flange in a longitudinal direction of the third body and having a head formed at one end portion thereof.

In one embodiment of the present invention, the first thickness may be 2.9 mm to 3.1 mm and the first interval may be 5.9 mm to 6.1 mm.

In one embodiment of the present invention, the first plate may be further provided with an auxiliary part forming an angle with one surface of the first plate and having the first coupling hole formed thereon.

To achieve the above technical solution, one embodiment of the present invention provides a universal coupler including: a link mechanism; a second plate having a flat plate shape and a second thickness, and including a plurality of second coupling holes formed to pass therethrough, the second coupling holes having the same shape and size and disposed at a second interval in at least one direction of a column direction and a row direction; a third plate having a flat plate shape and the second thickness, the first coupling holes of the first plate of the link mechanism and the second coupling holes being disposed in a zigzag shape at the second interval in at least one direction of the column direction and the row direction; and a second coupling piece inserted into the second coupling hole to couple the plate on which the second coupling hole is formed, wherein the first coupling piece of the link mechanism is inserted into the first coupling hole to couple the plate on which the first coupling hole is formed.

In one embodiment of the present invention, the second coupling hole may include a second through hole having a third diameter and second seating grooves having a fourth diameter larger than the third diameter and formed on both surfaces of the second plate to form a step between the second through hole and the second seating groove.

In one embodiment of the present invention, the third diameter may be 6.9 mm to 7.1 mm, the fourth diameter may be 8.9 mm to 9.1 mm, and a second depth of the second seating groove may be 1.8 mm to 2.0 mm.

In one embodiment of the present invention, the second coupling piece may include: a second socket having a fourth body on which a fourth elastic part inserted into the second coupling hole, split by a fourth slit and elastically deformed in a radial direction, is formed; a fifth seating flange formed at one end portion of the fifth body and coupled to the second seating groove formed on an outer surface of one outermost plate of the coupled plates; and a sixth seating flange formed on the fourth elastic part and coupled to the second seating groove formed on an outer surface of the other outermost plate of the coupled plates; and a second rivet having a fifth elastic part having an outer diameter corresponding to an inner diameter of an inserting hole passing through the second socket in a central axial direction, split by a fifth slit and elastically deformed in the radial direction; a fifth body inserted into the inserting hole to support the fourth elastic part in the radial direction; and a head formed at one end portion of the fifth body.

In one embodiment of the present invention, a guide groove may be formed on an inner surface of the inserting hole of the second socket in a longitudinal direction of the fourth slit on an extension line of the fourth slit to be spaced from the fourth slit, and a guide protrusion may be formed on an outer surface of the fifth elastic part to be inserted into the guide groove and slid along the fourth slit.

In one embodiment of the present invention, the fourth slit may have a stopper that protrudes inwardly to restrict movement of the guide protrusion which is completely coupled.

In one embodiment of the present invention, the second socket and the fifth body may be formed with a length which is an integral multiple of the second thickness.

In one embodiment of the present invention, the second coupling piece may include a sixth body having a sixth elastic part inserted into the second coupling hole, split by a sixth slit and elastically deformed in the radial direction; a seventh seating flange formed at one end portion of the sixth body and coupled to the second seating groove formed on an outer surface of one outermost plate of the coupled plates; an eighth seating flange formed on the sixth elastic part and coupled to the second seating groove formed on an outer surface of the other outermost plate of the coupled plates; and a head formed on an extension part extending from the eighth seating flange in a longitudinal direction of the sixth body.

In one embodiment of the present invention, the second thickness may be an even multiple of the first thickness and the second interval may be an even multiple of the first interval.

Meanwhile, to achieve the above technical solution, one embodiment of the present invention provides a universal coupler including: a link mechanism; a second plate having a flat plate shape and a second thickness which is an even multiple of the first thickness of the first plate of the link mechanism, the second plate including a plurality of second coupling holes that are formed to pass therethrough, have the same shape and size and are disposed at a second interval which is an even multiple of a first interval between the first coupling holes of the first plate, in at least one direction of a column direction and a row direction; a third plate having a flat plate shape and the second thickness, and including a plurality of second coupling holes formed to pass therethrough at the second interval in at least one direction of the column direction and the row direction, the third plate further including a plurality of first coupling holes formed at the second interval between columns of the second coupling holes in the column direction or between rows of the second coupling holes in the row direction; and a second coupling piece inserted into the second coupling hole to couple two or more second plates, two or more third plates or at least one second plate and the third plate, wherein the first coupling piece of the link mechanism is inserted into the first coupling hole to couple two or more first plates, two or more third plates or at least one first plate and the third plate.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 11 is an exemplary view showing a modified example of a first plate of a link mechanism according to another embodiment of the present invention;

DETAILED DESCRIPTION OF EXEMPLARY EMBODIMENTS

Figure 1:
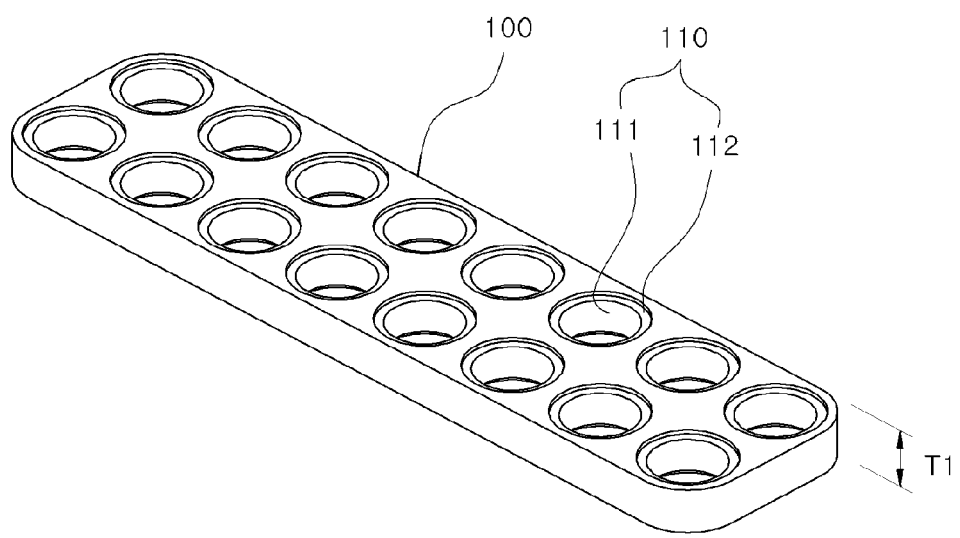
FIG. 1 is a perspective view illustrating a first plate of a link mechanism according to one embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. In addition, to more clearly illustrate the present invention, an element which is not related to the description is omitted from the drawings, and similar parts are indicated by similar reference numerals.

In the specification, the expression that one portion is "connected" to another portion can mean that the one portion is "directly connected" to the other portion or that the one portion is "indirectly connected" to the other portion via another member disposed therebetween. In addition, unless specifically indicated otherwise, the expression that one portion "comprises" some structural elements does not mean that other structural elements are excluded, and the one portion may in fact comprise other structural elements.

Figure 2:
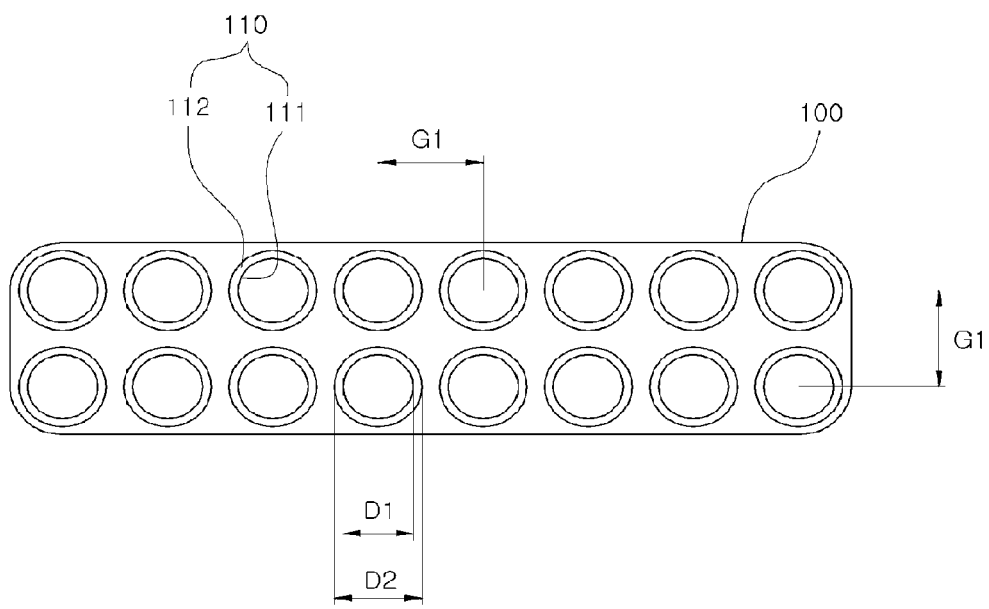
FIG. 2 is a plan view illustrating a first plate of a link mechanism according to one embodiment of the present invention.
Figure 3:
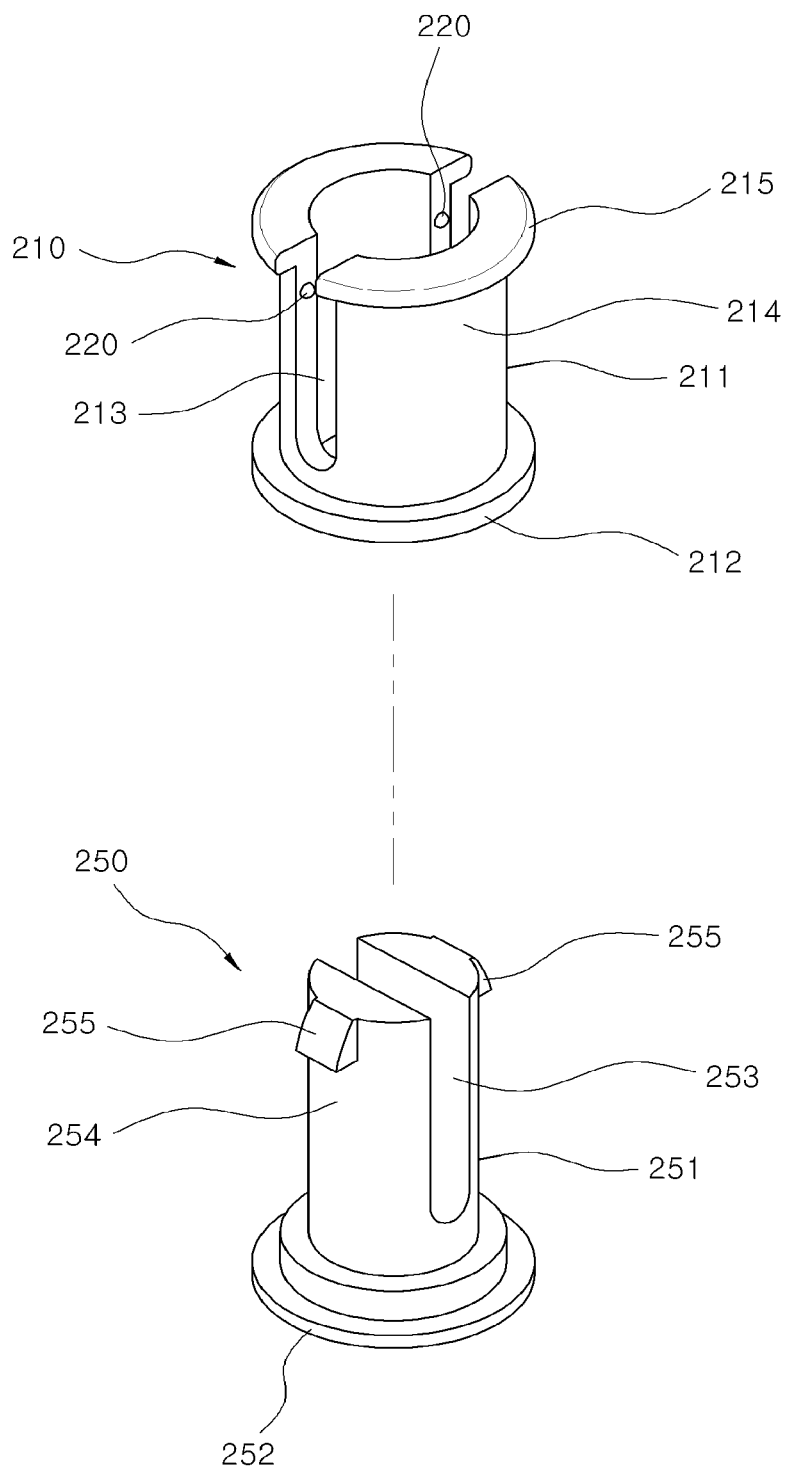
FIG. 3 and FIG. 4 are exploded perspective views illustrating a first coupling piece of a link mechanism according to one embodiment of the present invention.
Figure 4:
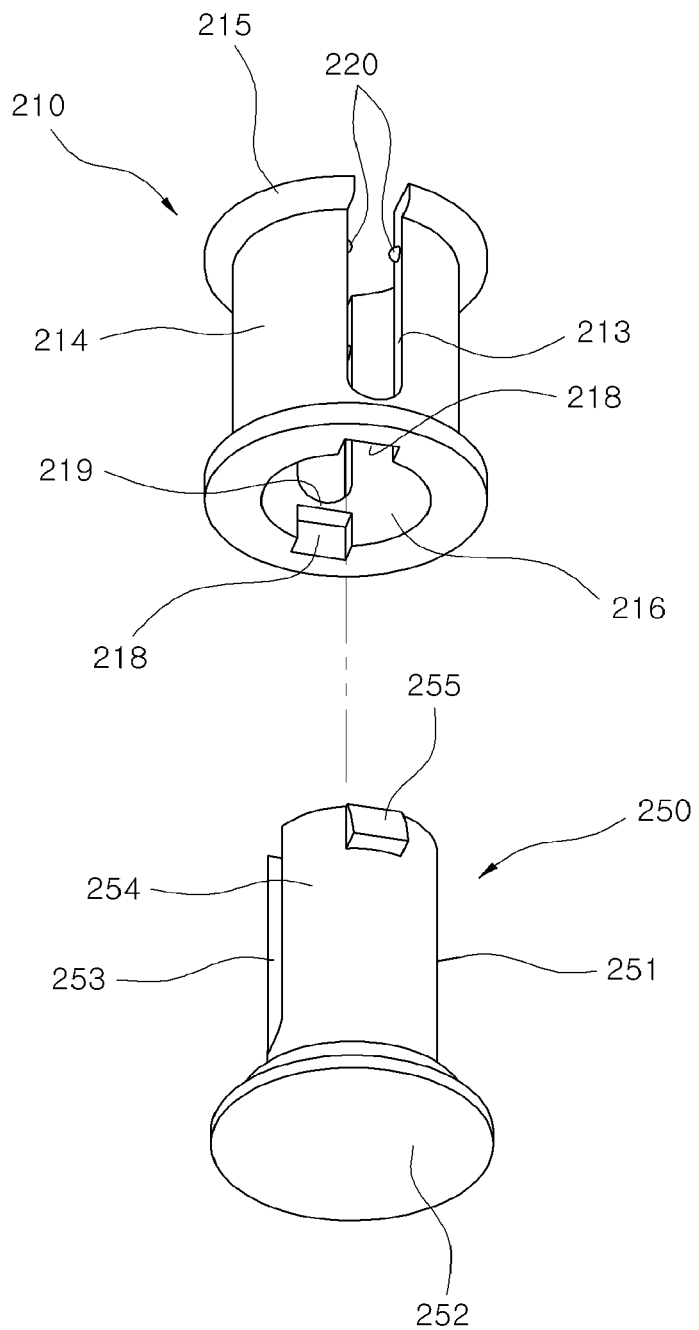
Figure 5:
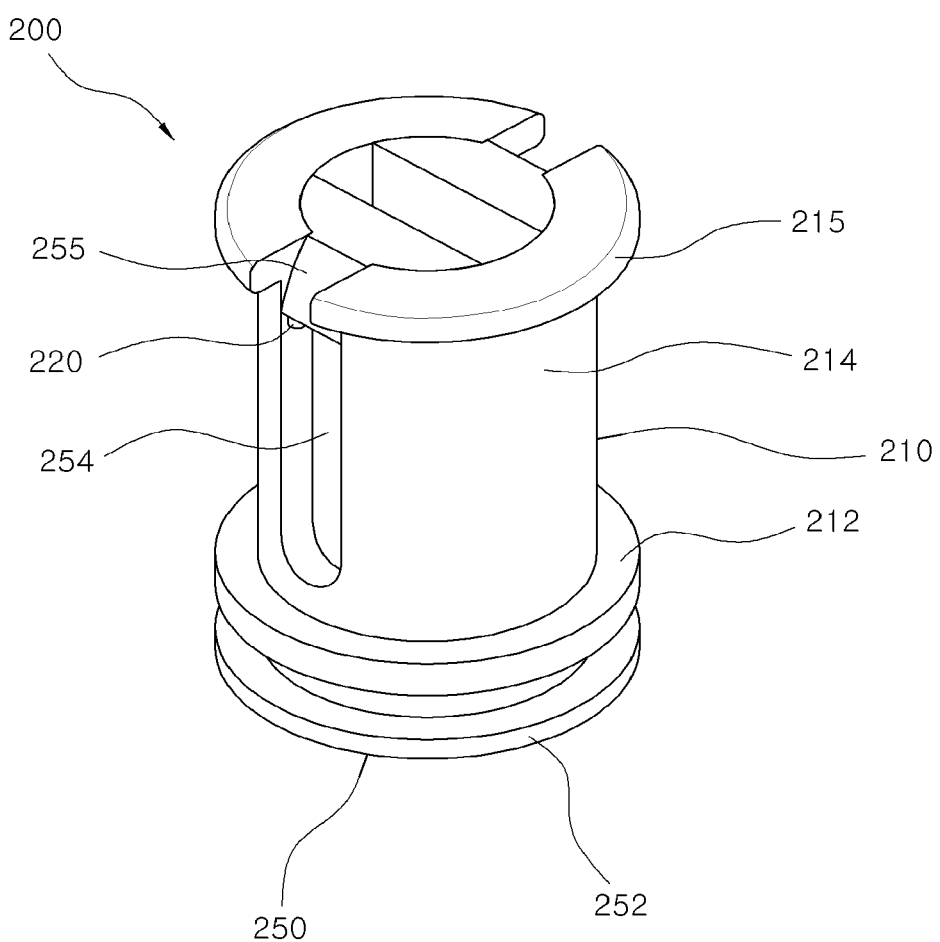
FIG. 5 is a perspective view showing a coupled state of a first coupling piece of a link mechanism according to one embodiment of the present invention.
Figure 6:
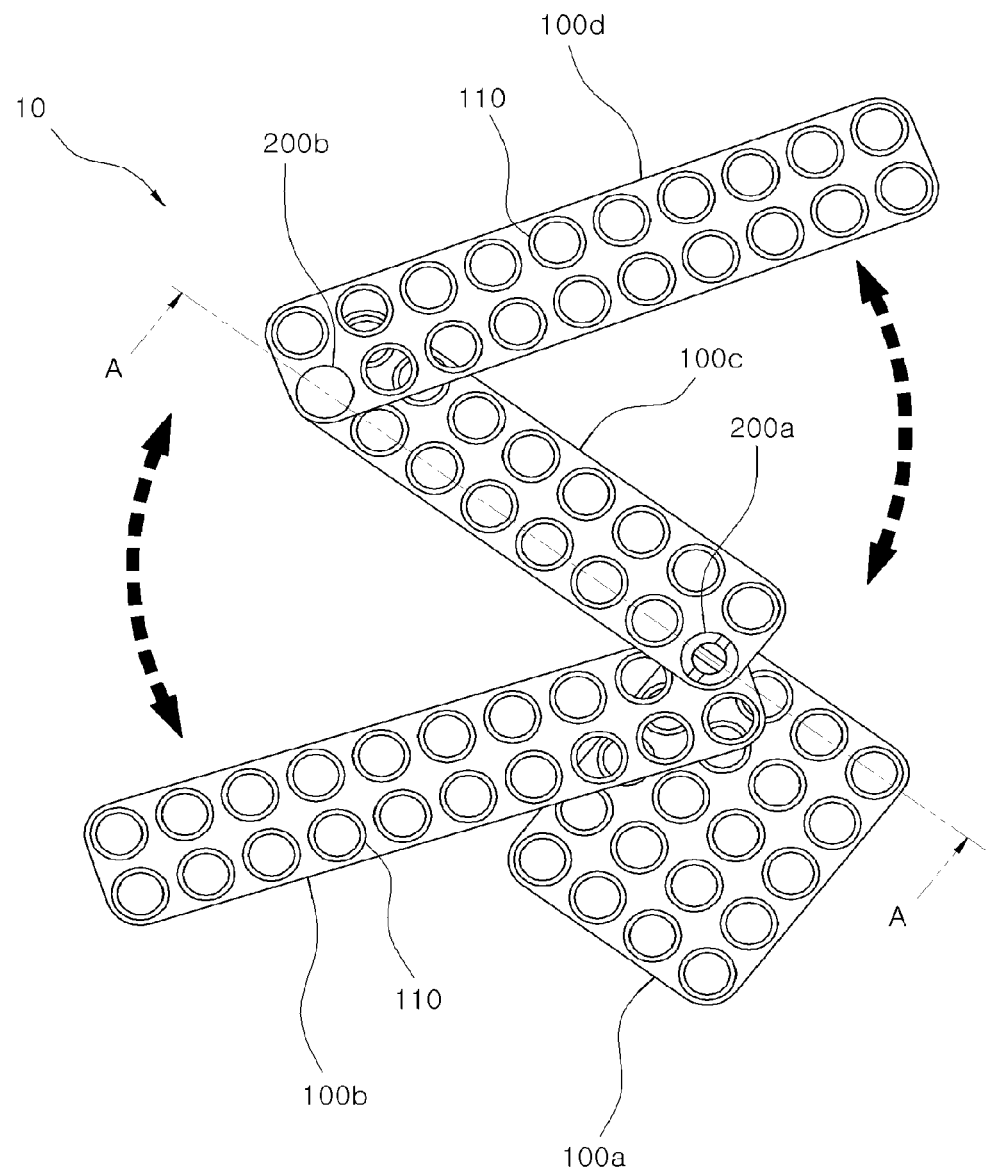
FIG. 6 is an exemplary view showing a state in which a first plate and a first coupling piece of a link mechanism according to one embodiment of the present invention are coupled to each other.
Figure 7:
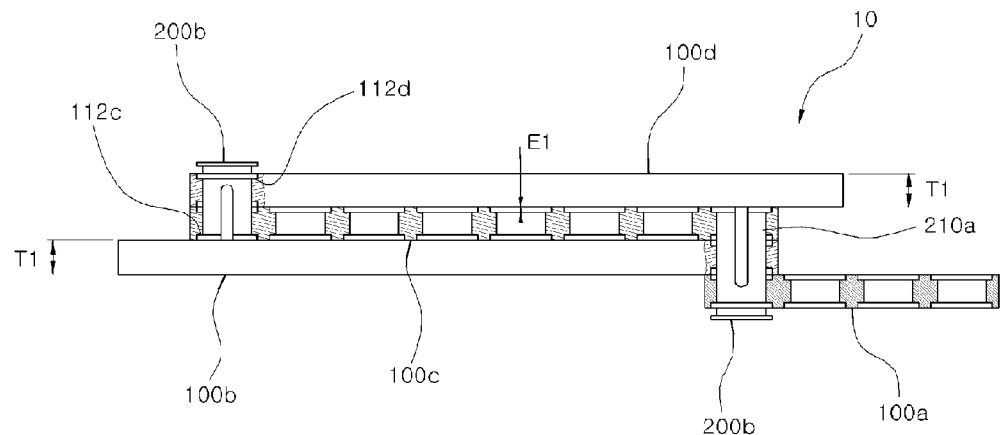
FIG. 7 is a sectional view taken along line A-A in FIG. 6.

FIG. 1 is a perspective view illustrating a first plate of a link mechanism according to one embodiment of the present invention, FIG. 2 is a plan view illustrating a first plate of a link mechanism according to one embodiment of the present invention, FIG. 3 and FIG. 4 are exploded perspective views illustrating a first coupling piece of a link mechanism according to one embodiment of the present invention, FIG. 5 is a perspective view showing a coupled state of a first coupling piece of a link mechanism according to one embodiment of the present invention, FIG. 6 is an exemplary view showing a state in which a first plate and a first coupling piece of a link mechanism according to one embodiment of the present invention are coupled to each other, and FIG. 7 is a sectional view taken along line A-A in FIG. 6.

As shown in FIG. 1 to FIG. 7, a link mechanism 10 may include a first plate 100 and a first coupling piece 200.

First of all, as shown in FIG. 1 and FIG. 2, the first plate 100 has a flat plate shape and may have a first thickness T1. The first plate 100 may be formed in a quadrilateral shape such as a rectangular shape or a square shape, as well as a circular shape. The first thickness T1 of the first plate 100 may be 2.9 mm to 3.1 mm.

A plurality of first coupling holes 110 having the same shape and size may be formed on the first plate 100 at a first interval G1 in at least one direction of the column direction and the row direction. The first gap G1 may be 5.9 mm to 6.1 mm.

Various numbers of the first coupling holes 110 may be formed on the first plate 100 in the column direction and the row direction. For example, the various numbers of the first coupling holes such as 1 (the number of the first coupling holes disposed in the column direction) *6 (the number of the first coupling holes disposed in the row direction), 1*7, 1*11, 2*5, 2*6, 2*7, 2*8, 2*15, 3*5, 3*7, 4*5, 5*5, 5*7, 5*12 may be formed.

The first plate 100 may be formed of a plastic material.

The first coupling hole 110 may have a first through hole 111 and a first seating groove 112, and the first through hole 111 may have a first diameter D1. The first diameter D1 may be 3.9 mm to 4.1 mm. The first seating groove 112 may be formed on each of both side surfaces of the first plate 100, may have a second diameter D2 larger than the first diameter D1, and may be formed with a first depth E1 (see FIG. 7). The second diameter D2 may be 4.9 mm to 5.1 mm, and the first depth E1 may be 0.8 mm to 1.0 mm. For this reason, a step may be formed between the first seating groove 112 and the first through hole 111.

The first coupling piece 200 can be inserted into each first coupling hole 110 of two or more first plates 100 so that the first coupling piece can couple two or more first plates 100 to each other.

The first coupling piece 200 may have a first socket 210 and a first rivet 250 which is selectively coupled to and detached from the first socket 210.

In addition, the first socket 210 may have a first body 211, a first seating flange 212 and a second seating flange 215.

The first body 211 is inserted into the first coupling hole 110 and forms a body of the first socket 210.

The first seating flange 212 is formed at one end portion of the first body 211 and may be coupled to a first seating groove 112d (see FIG. 7) formed on an outer surface of one outermost first plate 100d (see FIG. 7) of the coupled plates. An outer diameter of the first seating flange 212 may correspond to the second diameter D2 of the first seating groove 112 so that when the first seating flange 212 is placed in the first seating groove 112, the first socket 210 is not shaken or rattled.

On the first body 211, a first elastic part 214 which is split by first slits 213 and elastically deformed in the radial direction may be formed. An outer diameter of the first elastic part 214 may be the same as that of the first body 211, and the outer diameter of the first body 211 and the first elastic part 214 may correspond to the first diameter D1 of the first through hole 111 of the first coupling hole 110.

Since the first elastic part 214 is split by the first slits 213, if an external force is exerted, the first elastic part 214 may be deformed to allow both portions of the split end portion to approach each other. In addition, if the external force exerted on the first elastic part 214 is removed, the first elastic part 214 can be restored to its original shape by the elastic force.

The second seating flange 215 may be formed at one end portion of the first elastic part 214 and may be coupled to a first seating groove 112c (see FIG. 7) formed on an outer surface of the other outermost first plate 100c (see FIG. 7) of the coupled plates. An inserting hole 216 may be formed in the first socket 210, the inserting hole passes through the first socket in the central axial direction.

In addition, the first rivet 250 may consist of a second body 251 and a head 252.

The second body 251 can be inserted into the inserting hole 216 of the first socket 210, and may have an outer diameter corresponding to the inner diameter of the inserting hole 216. In addition, on the second body 251, a second elastic part 254 which is split by second slits 253 and elastically deformed in the radial direction may be formed.

If the second elastic part 254 is inserted into the inserting hole 216, the second elastic part supports the first elastic part 214 in the radial direction. In addition, since the first elastic part 214 is supported by the second elastic part 254 so that it is possible to prevent the first elastic part 214 from being deformed toward an inside, it is possible to inhibit the first coupling piece 200 from being pulled out of the first coupling hole 110.

The first socket 210 and the second body 251 may have a length which is an integral multiple of the first thickness T1 of the first plate 100. Due to the above, when the first socket 210 and the first rivet 250 are inserted into the first coupling hole 110, the first socket 210 may not protrude from an outer surface of the first plate 100. As shown in FIG. 6 and FIG. 7, as a result, if a plurality of first plates are coupled to each other and rotated with respect to each other, a jam between the first plates does not occur and smooth rotation of the first plate can be obtained.

The head 252 may be formed at one end portion of the second body 251. The head 252 may have a diameter corresponding to the outer diameter of the first seating flange 212. Also, since the head 252 has a certain thickness, after the first rivet 250 is inserted into the first socket 210, the head 252 may protrude from an outer surface of the first plate 100. Since a user can grip the head 252 protruding as described above with his or her hand, the user can grip and pull the head 252 to detach the first rivet 250 from the first socket 210. In order to allow the user to easily grasp the head with a hand, the head 252 may be inclined in the longitudinal direction of the second body 251 or may have a multi-step portion.

On the other hand, a guide groove 218 may be formed on an inner surface of the inserting hole 216 of the first socket 210. The guide groove 218 may be formed on an extension line of the first slit 213 in the longitudinal direction of the first slit 213, and may have a width corresponding to a width of the first slit 213. At this time, the guide groove 218 may be spaced from the first slit 213. Due to the above, a step 219 is formed between the guide groove 218 and the first slit 213 by an inner surface of the inserting hole 216.

A guide protrusion 255 may be formed to protrude on an outer surface of the second elastic part 254. The guide protrusion 255 may have a width corresponding to that of the guide groove 218 and may have a height corresponding to a depth of the guide groove 218. The guide protrusion 255 can be inserted into the guide groove 218, and the guide protrusion 255 slid along the guide groove 218 is engaged with the step 219 between the guide groove 218 and the first slit 213 so that the guide protrusion is pressurized. Consequently, the second elastic part 254 is deformed and wrinkled, and the guide protrusion 255 can pass over the step 219. Then, the guide protrusion 255 is located in the first slit 231 and can be slid along the first slit 213 so that the first rivet 250 can be correctly coupled to the first socket 210.

A stopper 220 may be provided in the first slit 213 for restricting the guide protrusion 255 which is completely coupled. The stopper 220 may protrude toward an inside of the first slit 213, and a pair of the stoppers may be formed. Due to the above, it is possible to effectively prevent the guide protrusion 255, which is completely coupled, from being slid again along the first slit 213 in the direction which is opposite to the insertion direction.

As shown in FIG. 6 and FIG. 7, three (3) first plates 100a, 100b and 100c which are the first, second and third plates from the bottom may be coupled to each other by a single first coupling piece 200a. In this case, a length of a first socket 210a of the first coupling piece 200a may be three times the first thickness T1 of the first plate. Three first plates 100a, 100b and 100c coupled to each other by the first coupling piece 200a can be independently rotated with respect to the first coupling piece 200a.

Two (2) first plates 100d and 100c which are the first and second plates from the top are coupled to each other by another first coupling piece 200b so that two first plates can be independently rotated with respect to the first coupling piece 200b.

Meanwhile, the uppermost first plate 100d is rotated and passes over the first coupling piece 200a by which the three (3) first plates 100a, 100b and 100c, which are the first, second and third plates from the bottom, are coupled to each other. In other words, the first coupling piece 200a by which the three (3) first plates 100a, 100b and 100c, which are the first, second and third plates from the bottom, are coupled to each other is positioned within a radius of rotation of the uppermost first plate 100d. Therefore, since the first coupling piece 200a coupling the three (3) first plates 100a, 100b and 100c, which are the first, second and third plates from the bottom, must not interrupt rotation of the uppermost first plate 100d, in this case, the first coupling piece 200a may be inserted upward from a lower side of the lowermost plate 100a to couple the first plates. Since the upper end portion of the first coupling piece 200a inserted as described above does not protrude from an upper surface of the first plate 100c which is the second plate from the top, the first coupling piece does not interrupt rotation of the uppermost first plate 100d.

Similarly, the first coupling piece 200b coupling the two (2) first plates 100d and 100c, which are the first and second plates from the top, is inserted downward from an upper side of the uppermost first plate 100d to couple the first plates so that rotation of the first plate 100b which is the second plate from the bottom can be uninterrupted.

Figure 8:
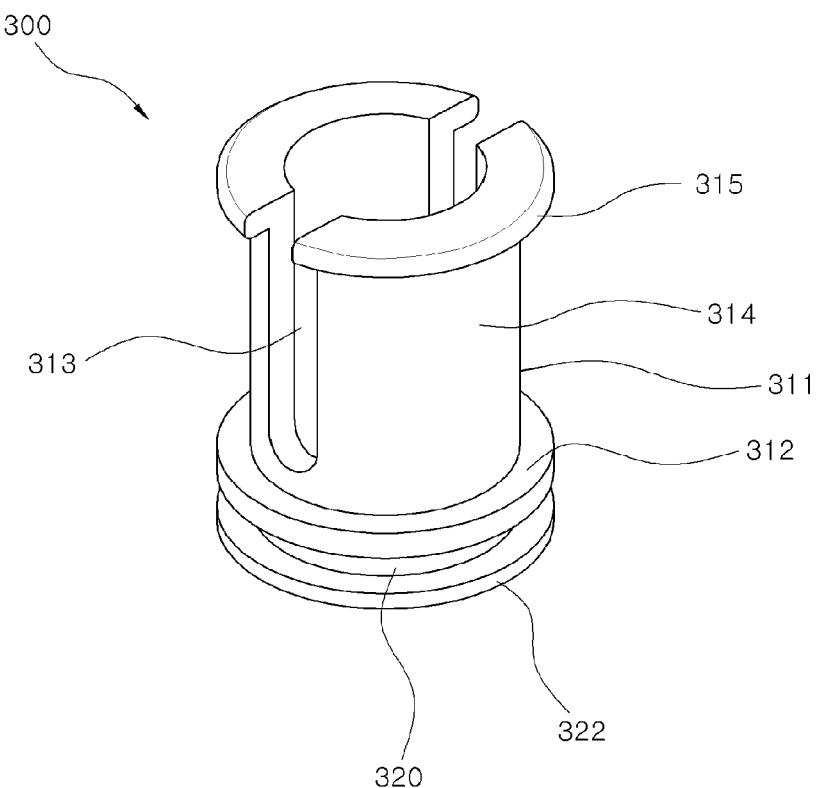
FIG. 8 and FIG. 9 are exploded perspective views illustrating a first coupling piece of a link mechanism according to another embodiment of the present invention.
Figure 9:
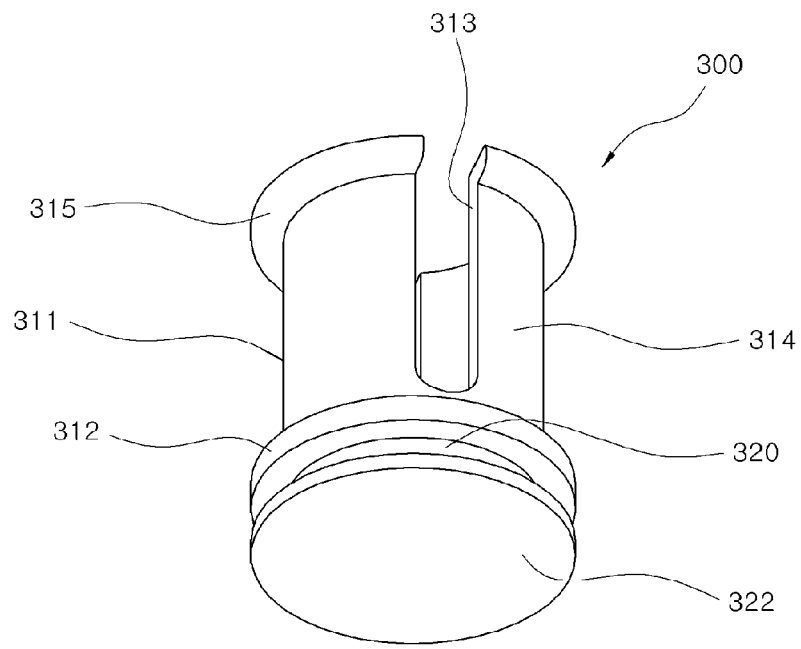
Figure 10:
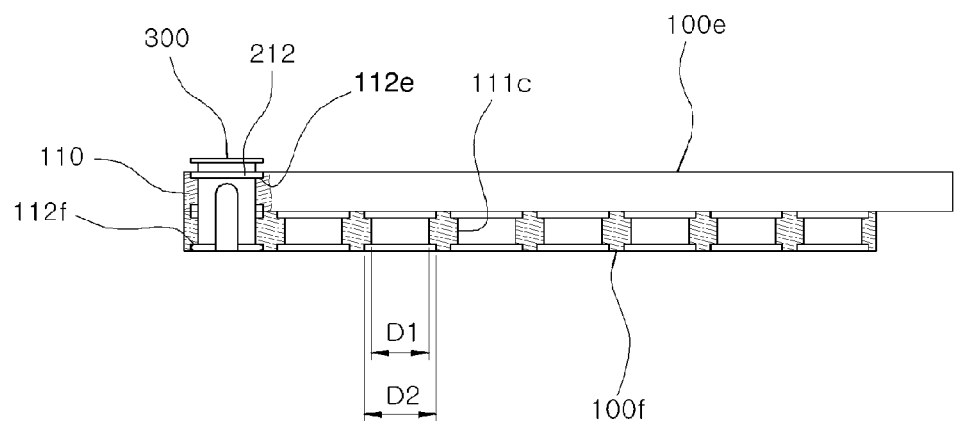
FIG. 10 is an exemplary view showing a state in which a first coupling piece of a link mechanism according to another embodiment of the present invention is coupled to a first plate.

FIG. 8 and FIG. 9 are exploded perspective views illustrating a first coupling piece of a link mechanism according to another embodiment of the present invention, and FIG. 10 is an exemplary view showing a state in which a first coupling piece of a link mechanism according to another embodiment of the present invention is coupled to a first plate.

As shown in FIG. 8 to FIG. 10, a first coupling piece 300 may have a third body 311, a third seating flange 312, a fourth seating flange 315 and an extension part 320.

The third body 311 forms a body of the first coupling piece 300 and may be inserted into the first coupling hole 110. The third body 311 may be formed with a length which is an integral multiple of the first thickness T1 of the first plates 100e and 100f.

The third seating flange 312 is formed at one end portion of the third body 311 and may be coupled to a first seating groove 112e formed on an outer surface of one outermost first plate 100e of the coupled first plates. An outer diameter of the third seating flange 312 may correspond to the second diameter D2 of the first seating groove 112e so that when the third seating flange 312 is placed in the first seating groove 112e, the first socket 310 is not shaken or rattled.

On the third body 311, a third elastic part 314 which is split by third slits 313 and elastically deformed in the radial direction may be formed. An outer diameter of the third elastic part 314 may be the same as that of the third body 311, and the outer diameter of the third body 311 and the third elastic part 314 may correspond to the first diameter D1 of the first through hole 111c of the first coupling hole 110. Since the third elastic part 314 is split by the third slits 313, if an external force is exerted, the third elastic part 314 may be deformed to allow both portions of the split end portion to approach each other. In addition, if the external force exerted on the third elastic part 314 is removed, the third elastic part 314 can be restored to its original shape by the elastic force.

The fourth seating flange 315 may be formed at one end portion of the third elastic part 314 and may be coupled to a first seating groove 112f formed on an outer surface of the other outermost first plate 100f of the coupled plates.

The third body 311, the third seating flange 312 and the fourth seating flange 315 of the first coupling piece 300 may be similar to or the same as the first socket 210 (see FIG. 3 to FIG. 5) as illustrated above.

The extension part 320 may extend from the fourth seating flange 315 in the longitudinal direction of the third body 311 and may have a head 322 formed at one end portion thereof.

The head 332 may be formed with a diameter corresponding to the outer diameter of the third seating flange 312. Also, since the head 352 is formed at one end portion of the extension part 320, after the first coupling piece 300 is inserted into the first coupling hole 110, the head 322 may protrude from an outer surface of the first plate 100. Since the user can grip the head 322 protruding as described above with his or her hand, the user can grip and pull the head 322 to easily detach the first coupling piece 300 from the first coupling hole 110.

FIG. 11 is an exemplary view showing a modified example of the first plate of the link mechanism according to another embodiment of the present invention.

As shown in FIG. 11, an auxiliary part 150 may be further formed on the first plate 100. The auxiliary part 150 may form an angle with any one surface of the first plate 100 and may have one or more first coupling holes 110 formed thereon. The first coupling hole 110 formed on the auxiliary part 150 may be the same as the first coupling hole 110 formed on the first plate 100.

For example, as shown (a) of FIG. 11, the auxiliary part 150 may have the shape formed by bending a portion of the first plate 100. Due to the above, the first plate 100 may have a "⊏" shape and may have various shapes such as an "L" shape, which are not shown in the drawings.

In other shape, as shown (b) of FIG. 11, the auxiliary part 150 may be partially formed on a portion of the first plate 100.

The first plate 100 provided with the above auxiliary part 150 may perform the functions of a hinge, a bracket, an adaptor or a joint so that it is possible to assemble the first plates into variously shaped assemblies.

The first plate 100 may form various angles, including an acute angle, a right angle or an obtuse angle, with the auxiliary part 150.

The first plate 100 and the first coupling piece 200 may be formed of a plastic material.

Figure 12:
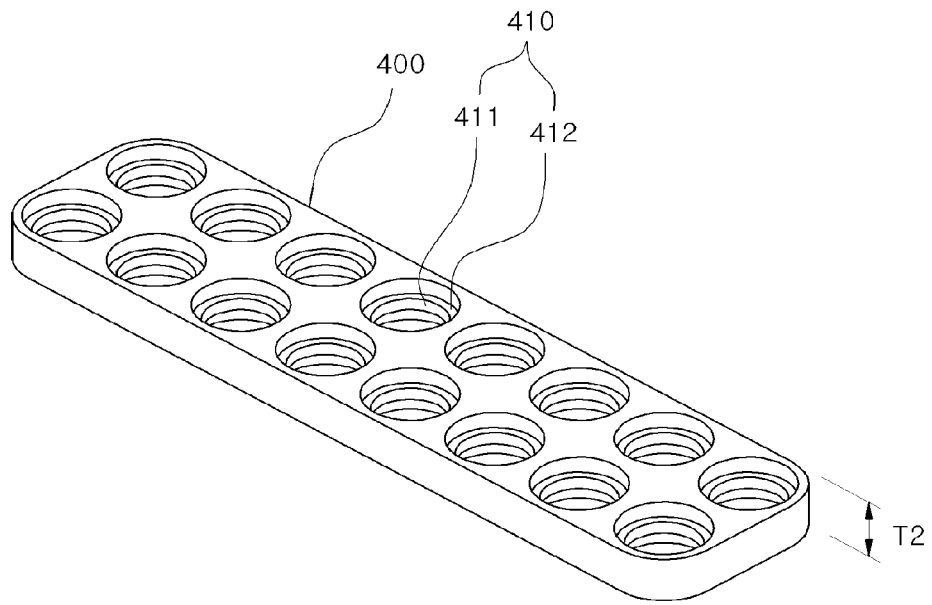
FIG. 12 is a perspective view illustrating a second plate of a universal coupler according to one embodiment of the present invention.
Figure 13:
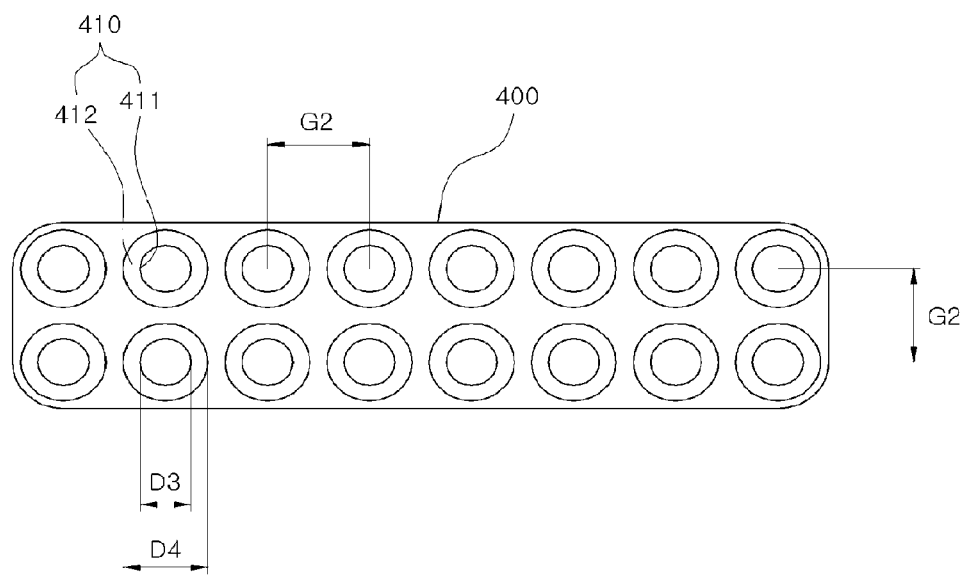
FIG. 13 is a plan view illustrating a second plate of a universal coupler according to one embodiment of the present invention.
Figure 14:
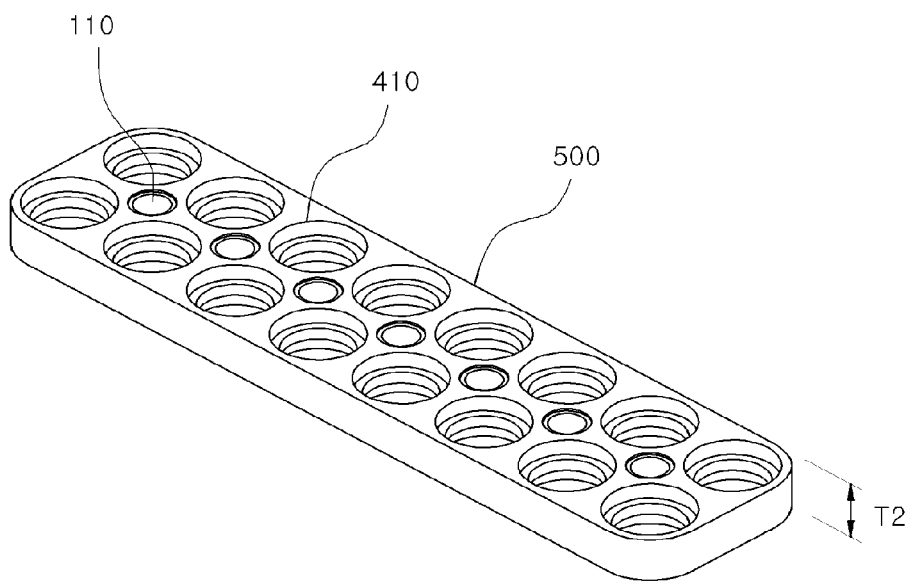
FIG. 14 is a perspective view illustrating a third plate of a universal coupler according to one embodiment of the present invention.
Figure 15:
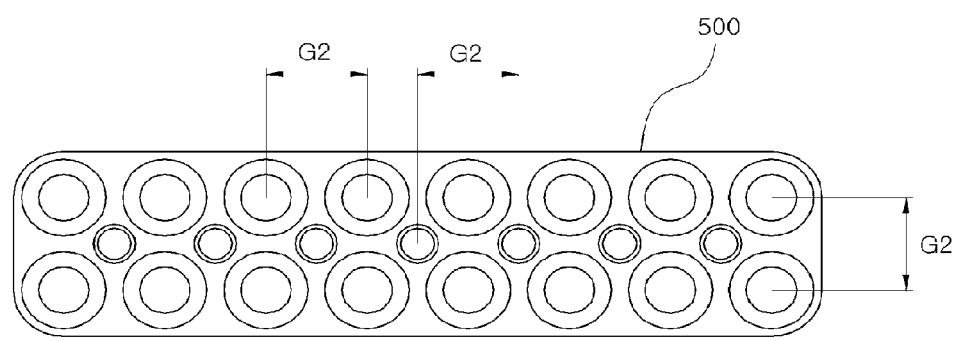
FIG. 15 is a plan view illustrating a third plate of a universal coupler according to one embodiment of the present invention.

FIG. 12 is a perspective view illustrating a second plate of a universal coupler according to one embodiment of the present invention, FIG. 13 is a plan view illustrating a second plate of a universal coupler according to one embodiment of the present invention, FIG. 14 is a perspective view illustrating a third plate of a universal coupler according to one embodiment of the present invention, and FIG. 15 is a plan view illustrating a third plate of a universal coupler according to one embodiment of the present invention.

First of all, as shown in FIG. 12 and FIG. 13, a second plate 400 may be a circular plate and may have a second thickness T2. The second plate 400 may be formed in a quadrilateral shape such as a rectangular shape or a square shape, as well as a circular shape. The second thickness T2 of the second plate 400 may be an even multiple of the first thickness T1 (see FIG. 1) of the first plate 100 (see FIG. 1).

A plurality of second coupling holes 410 having the same shape and size may be formed on the second plate 400 at a second interval G2 in at least one direction of the column direction and the row direction. Various numbers of the second coupling holes 410 may be formed in the column direction and the row direction, and the second interval G2 between the second coupling holes 410 may be the even multiple of the first interval G1 (see FIG. 2) between the first coupling holes 110 (see FIG. 2) of the first plate 100.

The second coupling hole 410 may have a second through hole 411 and a second seating groove 412, and the second through hole 411 may have a third diameter D3. The third diameter D3 may be 6.9 mm to 7.1 mm. The second seating groove 412 may be formed on both side surfaces of the second plate 400, may have a fourth diameter D4 larger than the third diameter D3, and may be formed with a second depth E2 (see FIG. 20). The fourth diameter D4 may be 8.9 mm to 9.1 mm, and the second depth E2 may be 1.8 mm to 2.0 mm. For this reason, a step may be formed between the second seating groove 412 and the second through hole 411.

In addition, as shown in FIG. 14 and FIG. 15, a third plate 500 may have a flat plate shape and may have the second thickness T2. Due to the above, a thickness of the two first plates 100 which overlap each other may be the same a thickness of the second plate 400 or the third plate 500 to enable the assemblies having various shapes to be assembled. The third plate 500 may be formed with a quadrilateral shape such as a rectangular shape or a square shape, as well as a circular shape.

The first coupling holes 110 and the second coupling holes 410 may be formed on the third plate 500, and the adjacent second coupling holes 410 are spaced from each other and the adjacent first coupling holes 110 are spaced from each other at the second interval G2. In other words, the shape of the first coupling hole 110 of the third plate 500 corresponds to that of the first coupling hole 110 of the first plate 100, and the adjacent first coupling holes 110 of the third plate are spaced from each other at the interval which is the same as that between the second coupling holes 410 of the second plate 400. Also, the shape of the second coupling hole 410 of the third plate 500 corresponds to that of the second coupling hole 410 of the second plate 400, and the adjacent second coupling holes 410 of the third plate are spaced from each other at the interval which is the same as that between the second coupling holes 410 of the second plate 400. Due to the above, the first plate 100 and the third plate 500 can be coupled to each other by the aforementioned first coupling piece 200 or 300, and the second plate 400 and the third plate 500 can also be coupled to each other by a second coupling piece 600 (which will be illustrated later).

In addition, the second coupling holes 410 of the third plate 500 may be formed at the second interval G2 in at least one of the column direction and the row direction, and the first coupling holes 110 may be formed in the column direction between the columns of the second coupling holes 410 or in the row direction between the rows of the second coupling holes 410 at the second interval G2. In other words, the first coupling holes 110 and the second coupling holes 410 may be disposed in zigzags in at least one direction of the column direction and the row direction. Due to the above, the second coupling hole 410 and the first coupling hole 110 of the third plate 500 may correspond to the first coupling hole 110 of the first plate 100 and the second coupling hole 410 of the second plate 400.

Like the first plate 100, an auxiliary part (not shown, but see "150" in FIG. 11) may be further formed on the second and third plates 400 and 500. The auxiliary part may form an angle with one surface of the second and third plates 400 and 500, and one or more the first coupling hole 110 and the second coupling hole 410 may be formed on the auxiliary part.

Figure 16:
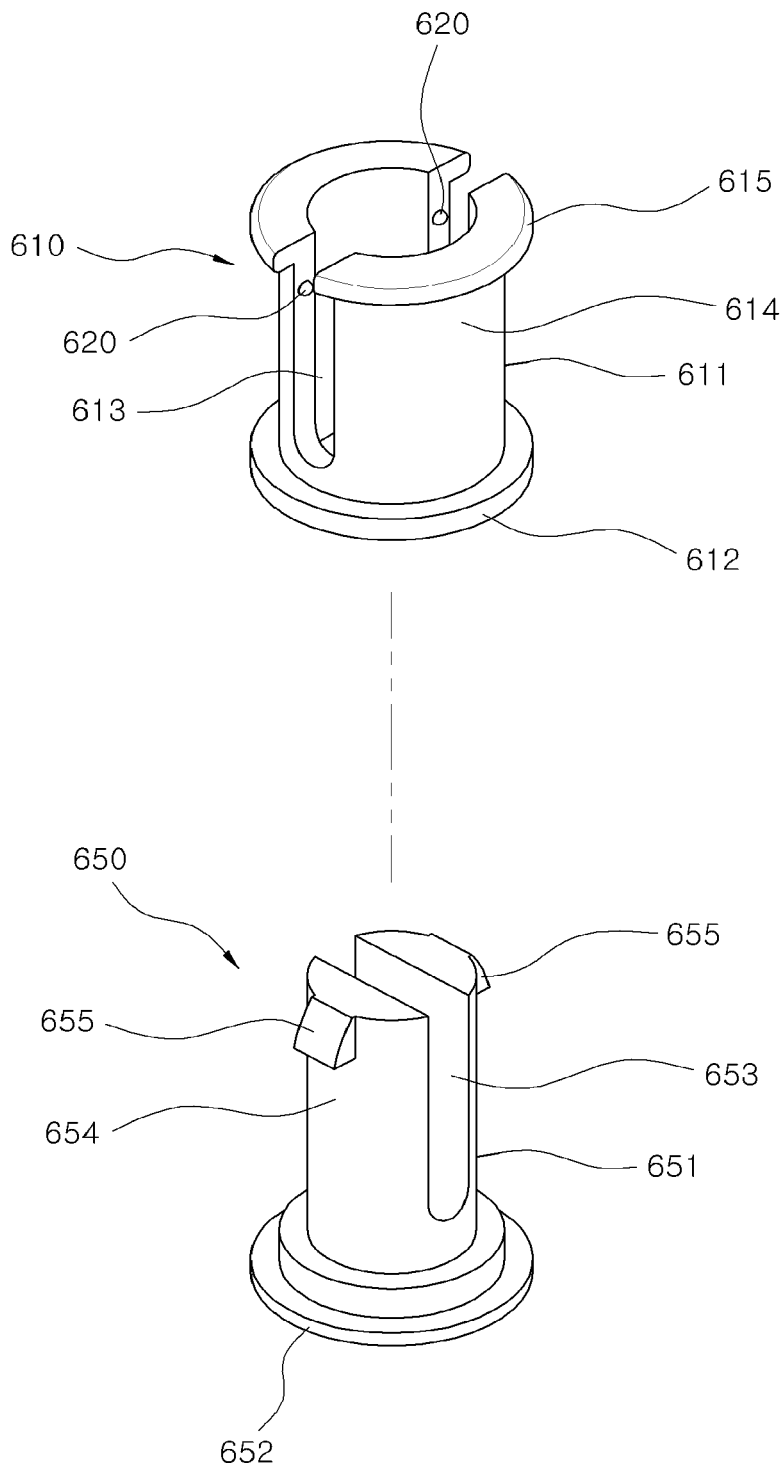
FIG. 16 and FIG. 17 are exploded perspective views illustrating a second coupling piece of a universal coupler according to one embodiment of the present invention.
Figure 17:
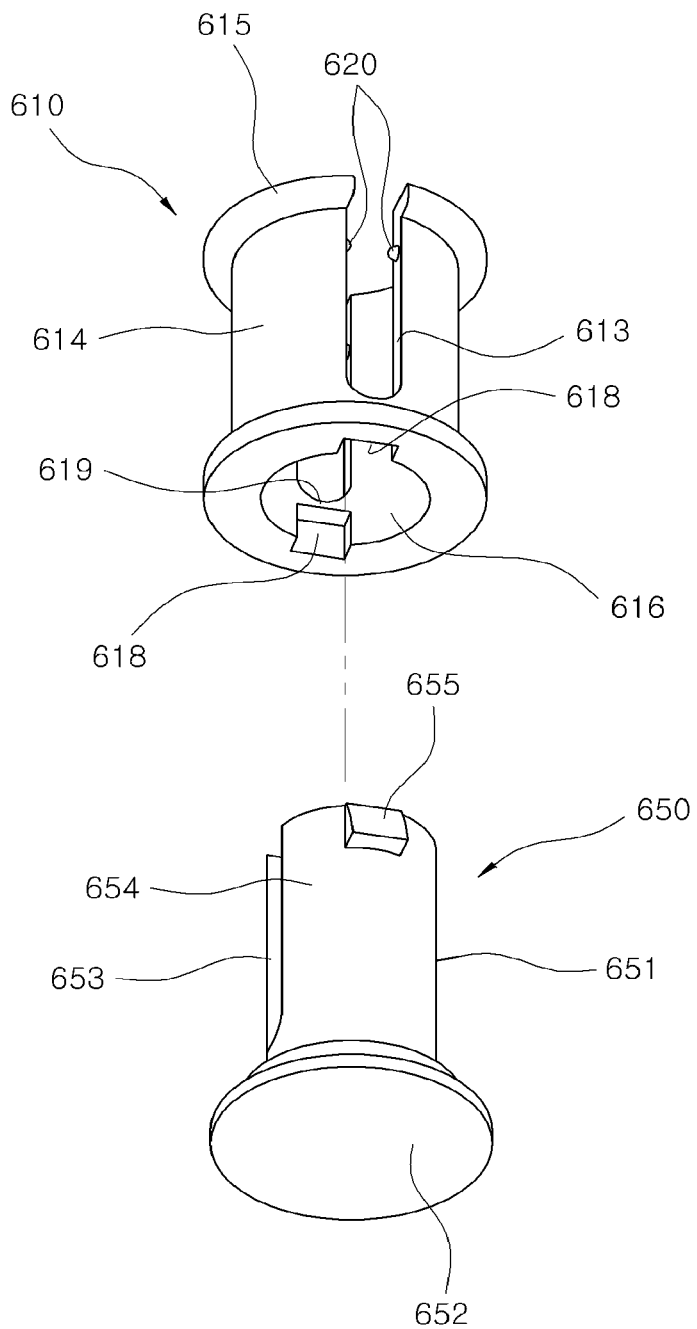
Figure 18:
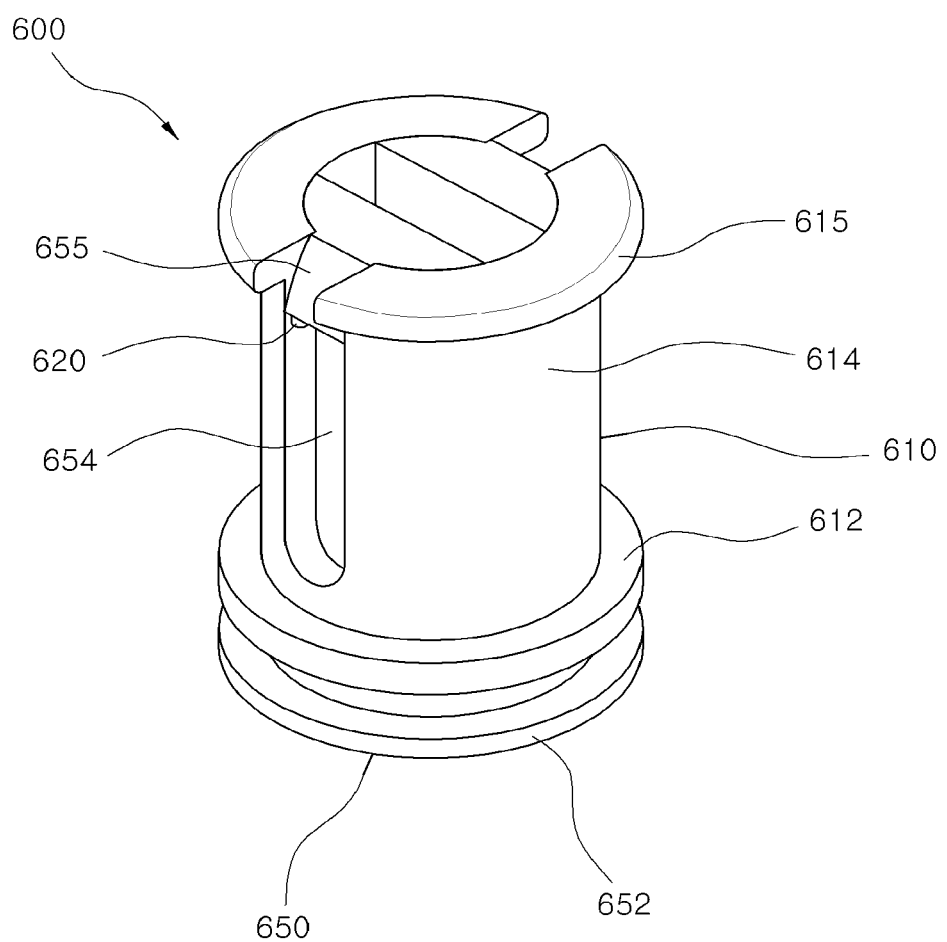
FIG. 18 is a perspective view illustrating a coupled state of a second coupling piece of a universal coupler according to one embodiment of the present invention.
Figure 19:
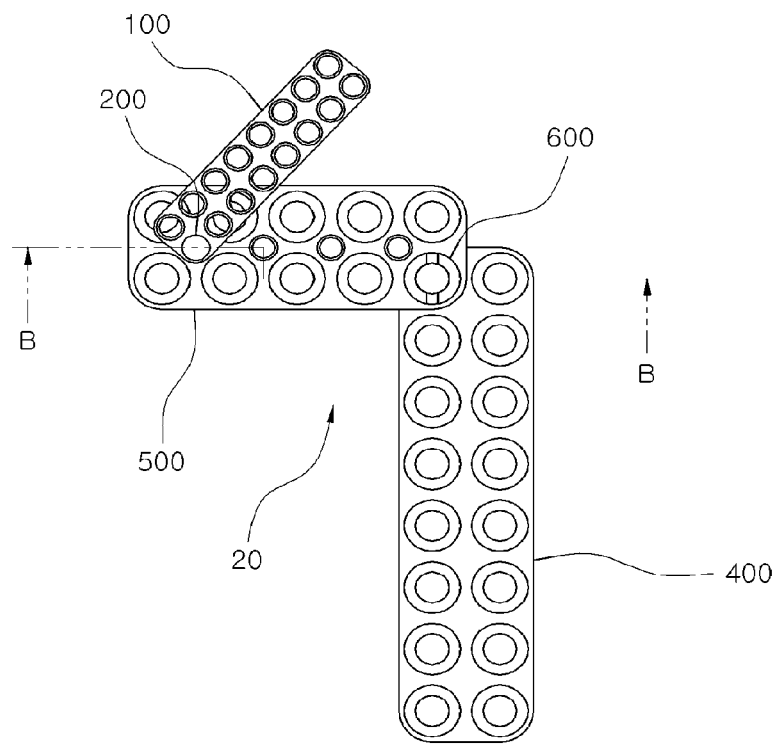
FIG. 19 is an exemplary view showing a state in which a plate and a coupling piece of a of a universal coupler according to one embodiment of the present invention are coupled to each other.
Figure 20:
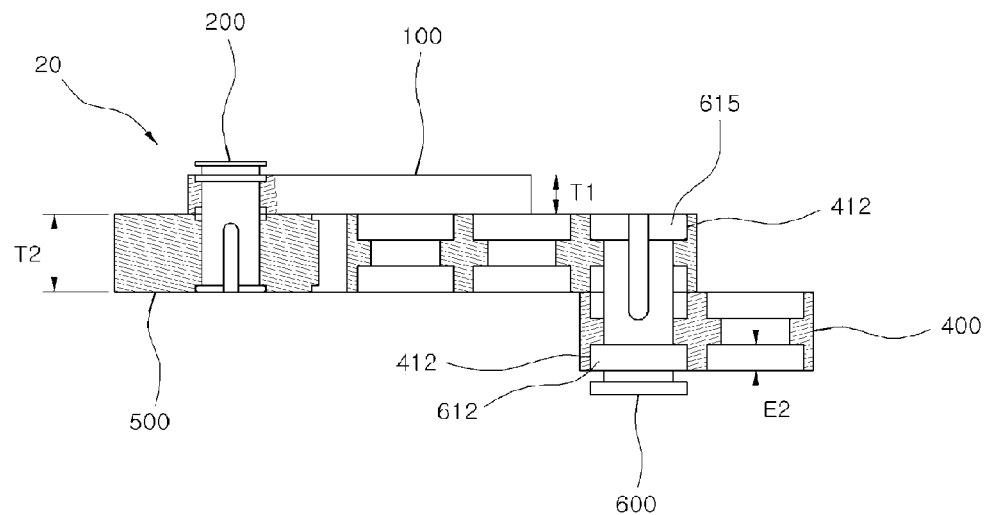
FIG. 20 is a sectional view taken along line B-B in FIG. 19.
Figure 21:
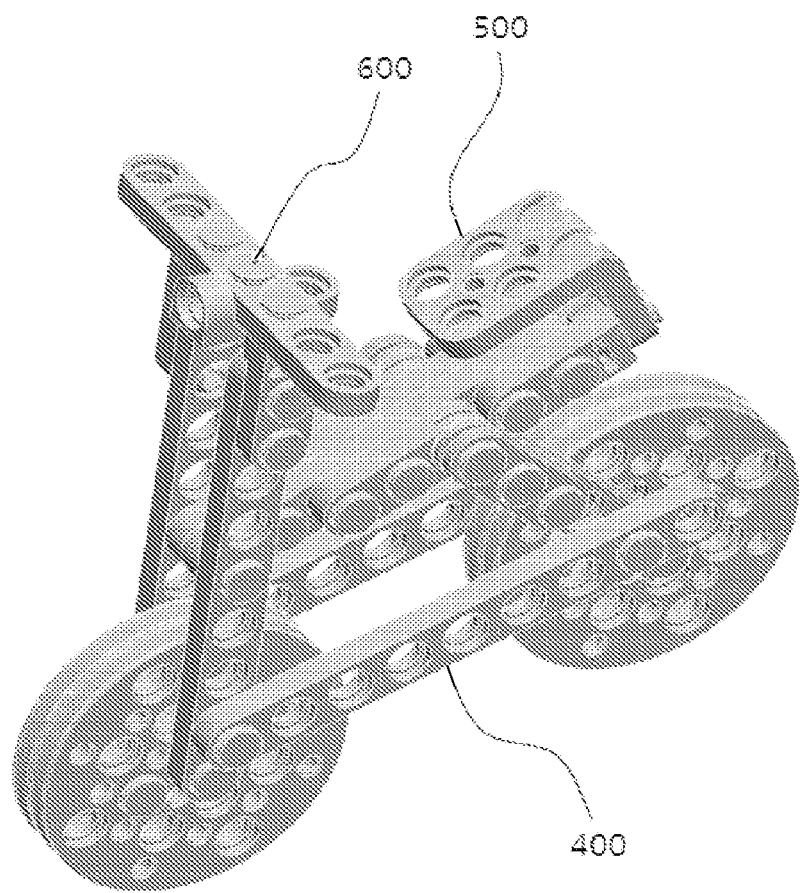
FIG. 21 is a perspective view illustrating one exemplary assembly obtained by utilizing a universal coupler according to one embodiment of the present invention.

FIG. 16 and FIG. 17 are exploded perspective views illustrating a second coupling piece of a universal coupler according to one embodiment of the present invention, FIG. 18 is a perspective view illustrating a coupled state of a second coupling piece of a universal coupler according to one embodiment of the present invention, FIG. 19 is an exemplary view showing a state in which a plate and a coupling piece of a of a universal coupler according to one embodiment of the present invention are coupled to each other, FIG. 20 is a sectional view taken along line B-B in FIG. 19, and FIG. 21 is a perspective view illustrating one exemplary assembly obtained by utilizing a universal coupler according to one embodiment of the present invention.

As shown in FIG. 16 to FIG. 21, the second coupling piece 600 may have a second socket 610 and a second rivet 650 which is selectively coupled to and detached from the second socket 610.

In addition, the second socket 610 may have a fourth body 611, a fifth seating flange 612 and a sixth seating flange 615.

The fourth body 611 is inserted into the second coupling hole 410 and forms a body of the second socket 610.

The fifth seating flange 612 is formed at one end portion of the fourth body 611 and may be coupled to the second seating groove 412 (see FIG. 20) formed on an outer surface of one outermost plate 400 (see FIG. 20) of the coupled plates. An outer diameter of the fifth seating flange 612 may correspond to the fourth diameter D4 of the second seating groove 412 so that when the fifth seating flange 612 is placed in the second seating groove 412, the second socket 610 is not shaken or rattled.

A fourth elastic part 614 which is split by fourth slits 613 and elastically deformed in the radial direction may be formed on the fourth body 611. An outer diameter of the fourth elastic part 614 may be the same as that of the fourth body 611, and the outer diameter of the fourth body 611 and the fourth elastic part 614 may correspond to the third diameter D3 of the second through hole 411 of the second coupling hole 410.

Since the fourth elastic part 614 is split by the fourth slits 613, if an external force is exerted, the fourth elastic part 614 may be deformed to allow both portions of the split end portion to approach each other. In addition, if the external force exerted on the fourth elastic part 614 is removed, the fourth elastic part 614 can be restored to its original shape by the elastic force.

The sixth seating flange 615 may be formed at one end portion of the fourth elastic part 614 and may be coupled to the second seating groove 412 (see FIG. 20) formed on an outer surface of the other outermost plate 500 (see FIG. 20) of the coupled plates.

An inserting hole 616 may be formed in the second socket 610, the inserting hole passes through the second socket in the central axial direction.

The second rivet 650 may consist of a fifth body 651 and a head 652.

The fifth body 651 can be inserted into the inserting hole 616 of the second socket 610, and may have an outer diameter corresponding to the inner diameter of the inserting hole 616. In addition, on the fifth body 651, a fifth elastic part 654 which is split by fifth slits 653 and elastically deformed in the radial direction may be formed.

If the fifth elastic part 654 is inserted into the inserting hole 616, the fifth elastic part supports the fourth elastic part 614 in the radial direction. In addition, since the fourth elastic part 614 is supported by the fifth elastic part 654 so that it is possible to prevent the fourth elastic part 614 from being deformed toward an inside, it is possible to prevent the second coupling piece 600 from being pulled out of the second coupling hole 410.

The second socket 610 and the fifth body 651 may have a length which is an integral multiple of the second thickness T2 of the second and third plates 400 and 500. Due to the above, when the second socket 610 and the second rivet 650 are inserted into the second coupling hole 410, the second socket 610 may not protrude from an outer surface of the coupled plate.

The head 652 may be formed at one end portion of the fifth body 651. The head 652 may have a diameter corresponding to the outer diameter of the fifth seating flange 612. Also, since the head 652 has a certain thickness, after the second rivet 650 is inserted into the second socket 610, the head 652 may protrude from an outer surface of the coupled plate. Since a user can grip the head 652 protruding as described above with his or her hand, the head helps the user to detach the second rivet 650 from the second socket 610.

On the other hand, a guide groove 618 may be formed on an inner surface of the inserting hole 616 of the second socket 610. The guide groove 618 may be formed on an extension line of the fourth slit 613 in the longitudinal direction of the fourth slit 613, and may have a width corresponding to a width of the fourth slit 613. At this time, the guide groove 618 may be spaced from the fourth slit 613. Due to the above, a step 619 is formed between the guide groove 218 and the fourth slit 613 by an inner surface of the inserting hole 616.

A guide protrusion 655 may be formed to protrude on an outer surface of the fifth elastic part 654. The guide protrusion 655 may have a width corresponding to that of the guide groove 628 and may have a height corresponding to a depth of the guide groove 618. The guide protrusion 655 can be inserted into the guide groove 618, and the guide protrusion 655 slid along the guide groove 618 is engaged with the step 619 between the guide groove 618 and the fourth slit 613 so that the guide protrusion is pressurized. Consequently, the fifth elastic part 654 is deformed and wrinkled, and the guide protrusion 655 can pass over the step 619. Then, the guide protrusion 655 is located in the fifth slit 631 and can be slid along the fourth slit 613 so that the second rivet 650 can be correctly coupled to the second socket 610.

A stopper 620 may be provided in the fourth slit 613 for restricting the guide protrusion 955 which is completely coupled. The stopper 620 may protrude toward an inside of the fourth slit 613, and a pair of the stoppers may be formed. Due to the above, it is possible to effectively prevent the guide protrusion 655, which is completely coupled, from being slid again along the fourth slit 613 in the direction which is opposite to the insertion direction.

Except for the size, the second coupling piece 600 may be formed such that the shape of the second coupling piece is the same as that of the first coupling piece 200 (see FIG. 3 to FIG. 5).

Meanwhile, as shown in FIG. 19 and FIG. 20, a universal coupler 20 may include the second plate 400, the third plate 500, the second coupling piece 600 and the link mechanism 10 (see FIG. 6 and FIG. 7).

The third plate 500 may be coupled to the first plate 100 by the first coupling piece 200 and may be coupled to the second plate 400 by the second coupling piece 600. If the third plate 500 is coupled to the first plate 100, a length of the first socket 210 of the first coupling piece 200 may be three times the first thickness T1 of the first plate 100. In addition, if the third plate 500 is coupled to the second plate 400, a length of the second socket 610 of the second coupling piece 600 may be twice the second thickness T2 of the first and third plates 400 and 500.

In addition, in order to prevent the plate from being engaged with the first and second coupling pieces 200 and 600 when each plate is rotated, the first coupling piece 200 may be inserted downward from an upper side of the first plate 100 and then coupled, and the second coupling piece 600 may be inserted upward from a lower side of the second plate 400 and then coupled.

As an example, the drawing illustrates the structure in which the single first plate 100 is coupled to the single third plate 500 by the first coupling piece 200, however, the first coupling piece 200 can couple the various plates on which the first coupling holes 110 are formed. For example, the first coupling piece 200 can couple two or more first plates 100, two or more third plates 500 or at least one first plate 100 and the third plate 500.

Similarly, the second coupling piece 600 can couple the various plates on which the second coupling holes 410 are formed. For example, the second coupling piece 600 can couple two or more second plates 400, two or more third plates 500 or at least one second plate 400 and the third plate 500.

By means of the above structures, the concrete combined assembly can be obtained as shown in FIG. 21.

Figure 22:
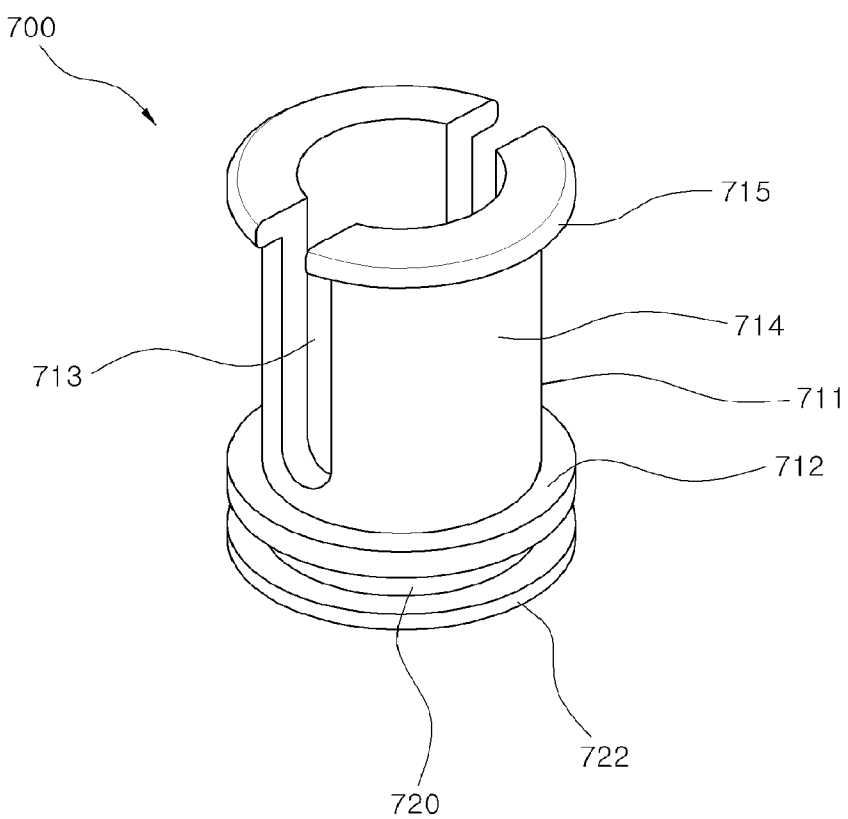
FIG. 22 and FIG. 23 are perspective views illustrating a second coupling piece of a universal coupler according to another embodiment of the present invention.
Figure 23:
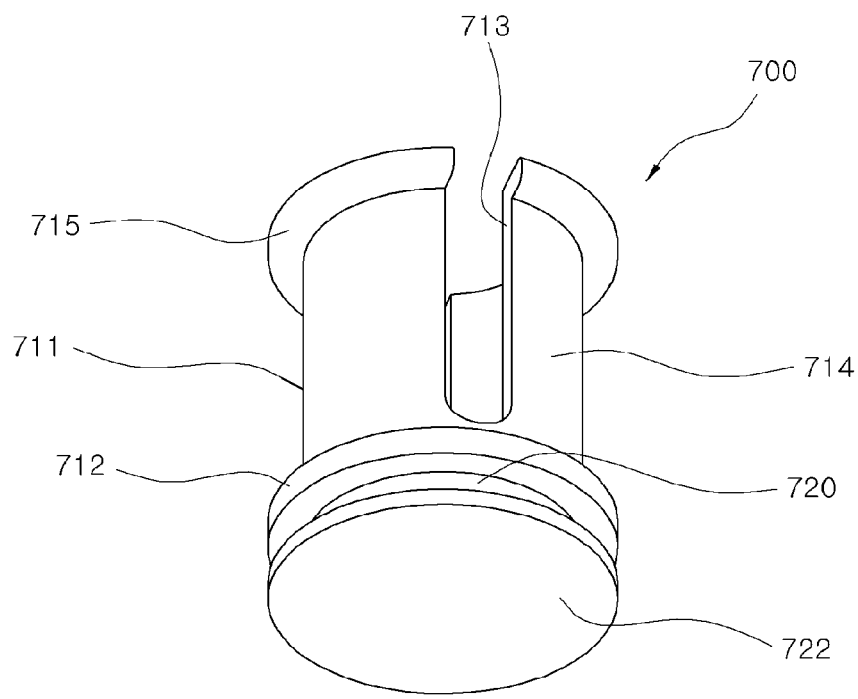

FIG. 22 and FIG. 23 are perspective views illustrating a second coupling piece of a universal coupler according to another embodiment of the present invention.

As shown in FIG. 22 and FIG. 23, a second coupling piece 700 may have a sixth body 711, a seventh seating flange 712, an eighth seating flange 715 and an extension part 720.

The sixth body 711 forms a body of the second coupling piece 700 and can be inserted into the second coupling hole 410. The sixth body 711 may be formed with a length which is an integral multiple of the second thickness T2 of the second and third plates 400 and 500.

The seventh seating flange 712 is formed at one end portion of the sixth body 711 and may be coupled to a second seating groove formed on an outer surface of one outermost plate of the coupled plates. In other words, the seventh seating flange 712 may correspond to the fifth seating flange 612 (see FIG. 16) of the aforementioned second coupling piece 600. An outer diameter of the seventh seating flange 712 may correspond to the fourth diameter D4 of the second seating groove 412 (see FIG. 13) so that when the seventh seating flange 712 is positioned in the second seating groove 412, the second coupling piece 700 is not shaken or rattled.

On the sixth body 711, a sixth elastic part 714 which is split by sixth slits 713 and elastically deformed in the radial direction may be formed. An outer diameter of the sixth elastic part 714 may be the same as that of the sixth body 711, and the outer diameter of the sixth body 711 and the sixth elastic part 714 may correspond to the third diameter D3 (see FIG. 13) of the second through hole 411 (see FIG. 13) of the second coupling hole 410 (see FIG. 13). Since the sixth elastic part 714 is split by the sixth slits 713, if an external force is exerted, the sixth elastic part 714 may be deformed to allow both portions of the split end portion to approach each other. In addition, if the external force exerted on the sixth elastic part 714 is removed, the sixth elastic part 714 can be restored to its original shape by the elastic force.

The eighth seating flange 715 may be formed at one end portion of the sixth elastic part 714 and may be coupled to a second seating groove formed on an outer surface of the other outermost plate of the coupled plates. That is, the eighth seating flange 715 may correspond to the sixth seating flange 615 (see FIG. 16) of the aforementioned second coupling piece 600.

Overall, the sixth body 711, the seventh seating flange 712 and the eighth seating flange 715 of the second coupling piece 700 may have similar shapes to the corresponding elements constituting the second socket 610 (see FIG. 16 to FIG. 18).

The extension part 720 may extend from the eighth seating flange 715 in the longitudinal direction of the sixth body 711 and may have a head 722 formed at one end portion thereof.

The head 722 may be formed with a diameter corresponding to an outer diameter of the seventh seating flange 712. Also, since the head 722 is formed at one end portion of the extension part 720, after the second coupling piece 700 is inserted into the second coupling hole 410, the head 722 may protrude from an outer surface of the coupled plate. Since the user can grip the head 722 protruding as described above with his or her hand, the user can grip and pull the head 722 to easily detach the second coupling piece 700 from the second coupling hole 410.

Except for the size, the second coupling piece 700 may be formed such that the shape of the second coupling piece is the same as that of the aforementioned first coupling piece 300 (see FIG. 8 and FIG. 9).

The second plate 400, the third plate 500 and the second coupling pieces 600 and 700 may be formed of a plastic material.

As illustrated above, the various kinds of plates and coupling pieces can be coupled to each other at various angles, a plurality of plates are coupled to each other according to a length of the plate, and the plates connected to each other can be independently rotated even when the coupling piece is coupled to the plates.

In addition, each of the plates illustrated above can have various shapes according to the number and the shape of the coupling holes, and various and concrete assemblies having a figure shape, a robot shape, a shape good for utility, etc. can be obtained according to various coupling forms of the plates.

According to one embodiment of the present invention, the various kinds of plates having different thickness and coupling holes with different sizes are provided and the plates are coupled to each other by the various kinds of coupling pieces according to a size of each coupling hole and a thickness of the plate so that the plates can be coupled to each other to obtain the assemblies having various shapes and structures.

According to one embodiment of the present invention, by forming the elastic part on the coupling piece, the coupling piece can be easily coupled to the coupling hole and it is possible to effectively prevent the coupled coupling piece from escaping from the coupling hole. Also, since the head is formed on the coupling piece, the user can easily separate the coupled coupling piece.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A link mechanism, comprising:
    a plurality of plates, each plate having a plurality of coupling holes formed to pass therethrough, each coupling hole comprising a through-hole having a first diameter and a seating groove having a second diameter which is larger than the first diameter of the through-hole and the through-hole and the seating groove formed on a surface of each plate to form a step between the through-hole and the seating groove,
    wherein each of the coupling holes has the same size and shape and is disposed at an interval in at least one of a column direction and a row direction; and
    a plurality of coupling pieces, each coupling piece comprising,
        a body having a cylindrical shape and forming an elastic part,
        a slit splitting the body and allowing elastic deformation of the body in a radial direction,
        a first seating flange connecting to one end of the body, the first seating flange configured to be coupled to the seating groove formed on the surface of each plate, and having a diameter corresponding to the second diameter of the seating groove,
        a second seating flange connecting to the other end of the body, wherein the body connects between the first and second seating flange, and has the slit beginning from the second seating flange,
        a non-detachable head having an outer diameter corresponding to an outer diameter of the first seating flange, and forming a closed end, and
        an extension part connecting between the first seating flange and the head, extending from the first seating flange in a longitudinal direction of the body,
        wherein the non-detachable head and the extension part protrude out of the seating groove when the first sating flange is coupled to the seating groove,
        wherein an outer diameter of the extension part is smaller than the outer diameter of the head and the first seating flange,
        wherein the head and the body are configured to move together as a whole, and
    wherein at least one of the coupling pieces is inserted into at least one of the coupling holes of two or more plates to couple the two or more plates to each other.

2. The link mechanism of claim 1, wherein the first diameter of the through-hole ranges from 3.9 mm to 4.1 mm, the second diameter of the seating groove ranges from 4.9 mm to 5.1 mm, and a depth of the seating groove ranges from 0.8 mm to 1.0 mm.

3. The link mechanism of claim 1, wherein a thickness of each plate ranges from 2.9 mm to 3.1 mm and the interval of each coupling hole ranges from 5.9 mm to 6.1 mm.

4. The link mechanism of claim 1, wherein at least one of the plates is further provided with an auxiliary part forming an angle with one surface of the plate and having the coupling hole formed thereon.

5. A link mechanism based universal coupler, comprising:
    a first plate having a plurality of first coupling holes formed to pass therethrough;
    a second plate having a plurality of second coupling holes formed to pass therethrough;
    a third plate having a plurality of third coupling holes corresponding to the first coupling holes and a plurality of fourth coupling holes corresponding to the second coupling holes, the third and fourth coupling holes formed to pass through the third plate, the third and fourth coupling holes being alternatively disposed with respect to one another at the same interval in at least one of a column direction and a row direction,
    wherein each of the first, second, third, and fourth coupling holes comprises a through-hole having a first diameter and a seating groove having a second diameter larger than the first diameter, the through-hole and the seating groove formed on a surface of each of the first, second, and the third plates to form a step between the through-hole and the seating groove;
    a plurality of coupling pieces, each coupling piece comprising,
        a body having a cylindrical shape and forming an elastic part,
        a slit splitting the body and allowing elastic deformation of the body in a radial direction,
        a first seating flange connecting to one end of the body, the first seating flange configured to be coupled to the seating groove formed on the surface of each plate; and having a diameter corresponding to the second diameter of the seating groove,
        a second seating flange connecting to the other end of the body, wherein the slit begins to split from the second seating flange,
        a non-detachable head having an outer diameter corresponding to an outer diameter of the first seating flange, and forming a closed end, and
        an extension part connecting between the first seating flange and the head, extending from the first seating flange in a longitudinal direction of the body,
        wherein the non-detachable head and the extension part protrude out of the seating groove when the first seating flanges coupled to the seating groove,
        wherein an outer diameter of the extension part is smaller than the outer diameter of the head and the first seating flange,
        wherein the head and the body are configured to move together as a whole,
    wherein the plurality of coupling pieces include a first coupling piece corresponding to the first coupling holes and a second coupling piece corresponding to the second coupling holes,
    wherein the second coupling piece is inserted into at least one of the second coupling holes to couple the second and third plates, and wherein the first coupling piece is inserted into at least one of the first coupling holes to coupe the first and third plates.

6. The universal coupler of claim 5, wherein the first diameter ranges from 6.9 mm to 7.1 mm, the second diameter ranges from 8.9 mm to 9.1 mm, and a depth of the seating groove ranges from 1.8 mm to 2.0 mm.

7. The universal coupler of claim 5, wherein,
a thickness of the second plate is an even multiple of a thickness of the first plate,
an interval of the second coupling holes is an even multiple of an interval of the first coupling holes.

8. A link mechanism based universal coupler, comprising:
a first flat shaped plate having a first thickness, and including a plurality of first coupling holes formed to pass therethrough, the first coupling holes having the same size and shape and being disposed at a first interval in at least one of a column direction and a row direction;
a second flat shaped plate having a second thickness which is an even multiple of the first thickness, the second plate including a plurality of second coupling holes that are formed to pass therethrough, the second coupling holes having the same shape and size and being disposed at a second interval which is an even multiple of the first interval in at least one direction of a column direction and a row direction;
a third flat shaped plate having a thickness the same as the second thickness, and including a plurality of third coupling holes corresponding to the plurality of second coupling holes, the third coupling holes formed to pass through the third plate at a third interval the same as the second interval in at least one direction of the column direction and the row direction,
wherein the third plate has a plurality of fourth coupling holes corresponding to the plurality of first coupling holes formed at a fourth interval the same as the second interval between columns of the third coupling holes in the column direction or between rows of the third coupling holes in the row direction,
wherein each of the first, second, third, and fourth coupling holes comprises a through-hole having a first diameter and a seating groove having a second diameter larger than the first diameter, the through-hole and the seating groove formed on a surface of each of the first, second, and the third flat shaped plates to form a step between the through-hole and the seating groove; and
a coupling piece inserted into one of the second coupling holes to couple two or more second plates, two or more third plates or at least one second plate and the third plate, wherein another coupling piece is inserted into one of the first coupling holes to couple two or more first plates, two or more third plates or at least one first plate and the third plate,
wherein the coupling piece comprises,
a body having a cylindrical shape and forming an elastic part,
a slit splitting the body and allowing elastic deformation of the body in a radial direction,
a first seating flange connecting to one end of the body, the first seating flange configured to be coupled to the seating groove formed on the surface of each plate, and having a diameter corresponding to the second diameter of the seating groove,
a second seating flange connecting to the other end of the body, wherein the body connects between the first and second seating flange, and has the slit beginning from the second seating flange,
a non-detachable head having an outer diameter corresponding to an outer diameter of the first seating flange, and forming a closed end, wherein the non-detachable head and the body are configured to move together as a whole, and
an extension part connecting between the first seating flange and the head, extending from the first seating flange in a longitudinal direction of the body,
wherein the non-detachable head and the extension part protrude out of the seating groove when the first seating flange is coupled to the seating groove, and
wherein an outer diameter of the extension part is smaller than the outer diameter of the head and the first seating flange.

* * * * *